US012670432B2

(12) United States Patent
Xu et al.

(10) Patent No.: US 12,670,432 B2
(45) Date of Patent: Jun. 30, 2026

(54) METHOD FOR TRAINING DATA PROCESSING MODEL, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Yangkai Xu, Beijing (CN); Guibin Wang, Beijing (CN); Xiaoyin Fu, Beijing (CN); Zhijie Chen, Beijing (CN); Mingshun Yang, Beijing (CN); Shijun Cong, Beijing (CN); Ming Jia, Beijing (CN); Lei Jia, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 1099 days.

(21) Appl. No.: 17/655,253

(22) Filed: Mar. 17, 2022

(65) Prior Publication Data

US 2022/0207427 A1     Jun. 30, 2022

(30) Foreign Application Priority Data

May 27, 2021     (CN) .......................... 202110584511.2

(51) Int. Cl.
*G06N 20/00*          (2019.01)

(52) U.S. Cl.
CPC .................................... *G06N 20/00* (2019.01)

(58) Field of Classification Search
CPC ........ G06N 20/00; G06N 3/044; G06N 3/063; G06N 3/082; G06N 3/084; G06N 3/049; G06F 18/214; G06F 18/217
See application file for complete search history.

(56) References Cited

U.S. PATENT DOCUMENTS

| | | | | |
|---|---|---|---|---|
| 12,248,367 | B2 * | 3/2025 | Baum ................. | G06F 11/2215 |
| 2002/0181799 | A1 * | 12/2002 | Matsugu ............... | G06V 10/94 |
| | | | | 382/260 |

(Continued)

FOREIGN PATENT DOCUMENTS

| | | |
|---|---|---|
| CN | 112529210 A | 3/2021 |
| JP | 2011221927 A | 11/2011 |
| JP | 2020135748 A | 8/2020 |

OTHER PUBLICATIONS

Extended European Search Report issued for corresponding European patent application 22163265.6, mailed Sep. 27, 2022 (9 pages).

(Continued)

*Primary Examiner* — Oluwatosin Alabi

(74) *Attorney, Agent, or Firm* — Osha Bergman Watanabe & Burton LLP

(57) ABSTRACT

A method for training a data processing model includes: acquiring sample data; acquiring an initial data processing model, the initial data processing model including a plurality of forward nodes for outputting a plurality of intermediate results corresponding to the sample data; determining a plurality of time-dependent features corresponding to the plurality of forward nodes; acquiring a data processing model to be trained by processing the initial data processing model based on the plurality of time-dependent features; and training the data processing model to be trained using the sample data and the plurality of intermediate results.

16 Claims, 8 Drawing Sheets

(56)                    References Cited

U.S. PATENT DOCUMENTS

| | | | |
|---|---|---|---|
| 2018/0174054 A1* | 6/2018 | Wild ...................... | G06N 3/006 |
| 2019/0188572 A1 | 6/2019 | Lanctot et al. | |
| 2020/0202179 A1* | 6/2020 | Rajarathinam .......... | G06N 5/04 |
| 2022/0058467 A1* | 2/2022 | Baker ................... | G06N 3/082 |

OTHER PUBLICATIONS

Tianqi Chen, et al, "Training Deep Nets with Sublinear Memory Cost;" Cornell University Library; Apr. 21, 2016 (12 pages).
Paras Jain, et al, "Checkmate: Breaking the Memory Wall With Optimal Tensor Rematerialization;" Proceedings of the 3rd Conference on Machine Learning and Systems; May 14, 2020 (15 pages).
Notification of Reasons for Refusal issued in Japanese Application No. 2022-039275, mailed on Apr. 18, 2023 (8 pages).

* cited by examiner

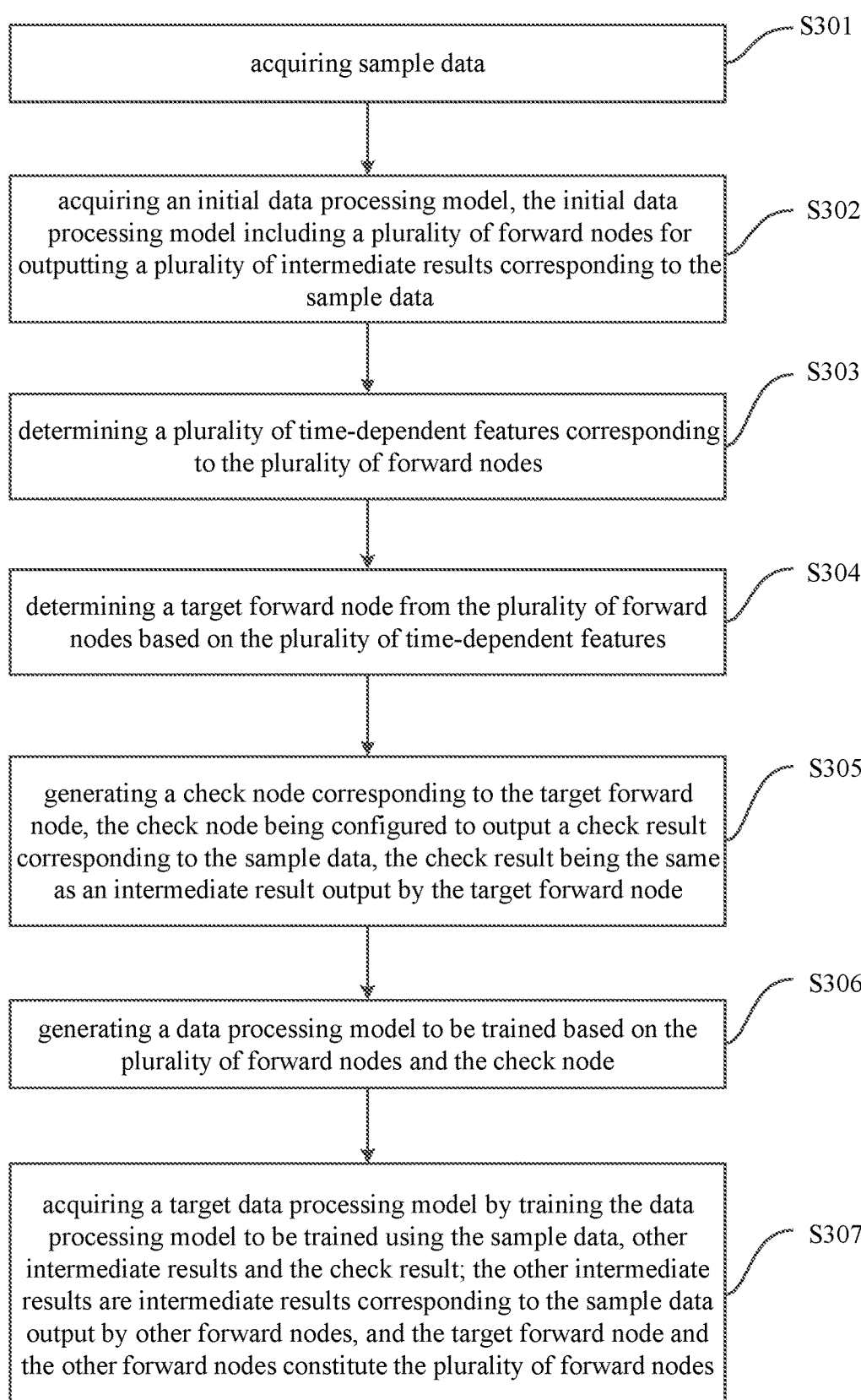

acquiring sample data　S301 acquiring an initial data processing model, the initial data processing model including a plurality of forward nodes for outputting a plurality of intermediate results corresponding to the sample data　S302 determining a plurality of time-dependent features corresponding to the plurality of forward nodes　S303 determining a target forward node from the plurality of forward nodes based on the plurality of time-dependent features　S304 generating a check node corresponding to the target forward node, the check node being configured to output a check result corresponding to the sample data, the check result being the same as an intermediate result output by the target forward node　S305 generating a data processing model to be trained based on the plurality of forward nodes and the check node　S306 acquiring a target data processing model by training the data processing model to be trained using the sample data, other intermediate results and the check result; the other intermediate results are intermediate results corresponding to the sample data output by other forward nodes, and the target forward node and the other forward nodes constitute the plurality of forward nodes　S307

FIG. 3

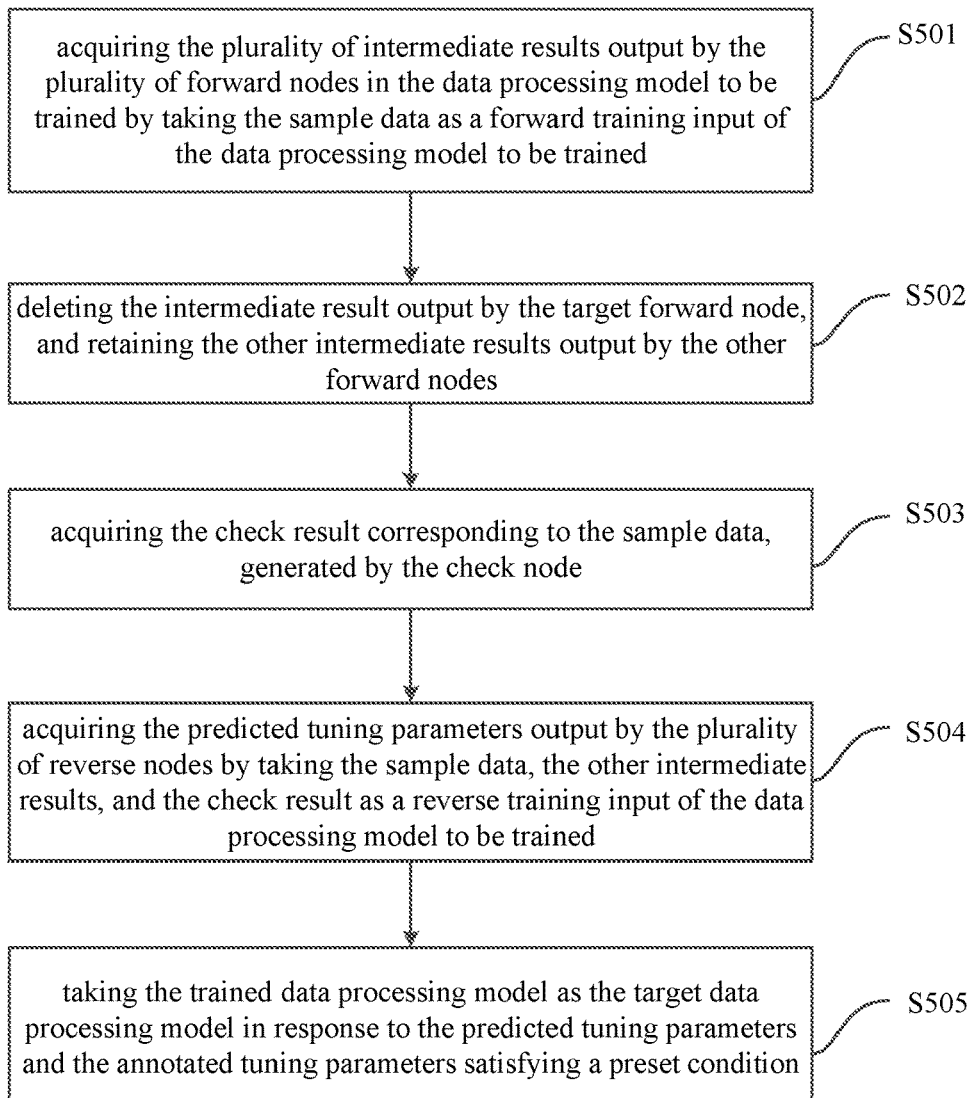

acquiring the plurality of intermediate results output by the plurality of forward nodes in the data processing model to be trained by taking the sample data as a forward training input of the data processing model to be trained ⟋ S501 deleting the intermediate result output by the target forward node, and retaining the other intermediate results output by the other forward nodes ⟋ S502 acquiring the check result corresponding to the sample data, generated by the check node ⟋ S503 acquiring the predicted tuning parameters output by the plurality of reverse nodes by taking the sample data, the other intermediate results, and the check result as a reverse training input of the data processing model to be trained ⟋ S504 taking the trained data processing model as the target data processing model in response to the predicted tuning parameters and the annotated tuning parameters satisfying a preset condition ⟋ S505

FIG. 5

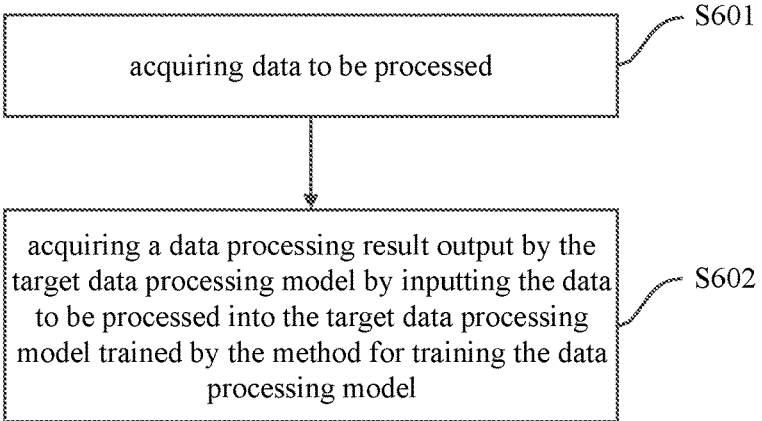

acquiring data to be processed ⟋ S601 acquiring a data processing result output by the target data processing model by inputting the data to be processed into the target data processing model trained by the method for training the data processing model ⟋ S602

FIG. 6

METHOD FOR TRAINING DATA PROCESSING MODEL, ELECTRONIC DEVICE AND STORAGE MEDIUM

CROSS-REFERENCE TO RELATED APPLICATION

This application claims priority to Chinese Patent Application No. 202110584511.2, filed on May 27, 2021, the entire content of which is incorporated herein by reference.

TECHNICAL FIELD

The disclosure relates to the field of computer technologies, in particularly to the field of artificial intelligence (AI) technologies such as deep learning (DL) and big data processing, and especially to a method for training a data processing model, an electronic device and a storage medium.

BACKGROUND

Artificial intelligence (AI) is a subject that learns to simulate through computers thinking processes and intelligent behaviors (such as learning, reasoning, thinking and planning) of human beings, which covers hardware-level technologies and software-level technologies. AI hardware technologies include technologies such as sensors, dedicated AI chips, cloud computing, distributed storage and big data processing; and AI software technologies include computer vision technology, speech recognition technology, natural language processing(NLP) technology, machine learning (ML), deep learning(DL), big data processing technology, knowledge graph(KG) technology and the like.

In the related art, when a data processing model is trained, a large number of intermediate results may be generated by the data processing model and the intermediate results may occupy a large number of memories, affecting a training efficiency of the data processing model.

SUMMARY

According to a first aspect of the disclosure, a method for training a data processing model is provided and includes: acquiring sample data; acquiring an initial data processing model, the initial data processing model including a plurality of forward nodes for outputting a plurality of intermediate results corresponding to the sample data; determining a plurality of time-dependent features corresponding to the plurality of forward nodes; acquiring a data processing model to be trained by processing the initial data processing model based on the plurality of time-dependent features; and acquiring a target data processing model by training the data processing model to be trained using the sample data and the plurality of intermediate results.

According to a second aspect of the disclosure, a method for processing data is provided and includes: acquiring data to be processed; and acquiring a data processing result output by the target data processing model by inputting the data to be processed into the target data processing model trained by the above method for training the data processing model.

According to a third aspect of the disclosure, an electronic device is provided and includes: at least one processor; and a memory communicatively connected to the at least one processor; in which the memory is configured to store instructions executable by the at least one processor, and when the instructions are performed by the at least one processor, the at least one processor is caused to perform the method for training the data processing model as described in the first aspect of the disclosure or the method for processing data as described in the second aspect of the disclosure.

According to a fourth aspect of the disclosure, a non-transitory computer-readable storage medium stored with computer instructions is provided. The computer instructions are configured to cause a computer to perform the method for training the data processing model as described in the first aspect or the method for processing data as described in the second aspect.

It should be understood that, the content described in the part is not intended to identify key or important features of embodiments of the disclosure, nor intended to limit the scope of the disclosure. Other features of the disclosure will be easy to understand through the following specification.

BRIEF DESCRIPTION OF THE DRAWINGS

The drawings are intended to better understand the solution, and do not constitute a limitation to the disclosure.

FIG. 3 is a diagram according to a second embodiment of the disclosure;

FIG. 5 is a diagram according to a third embodiment of the disclosure;

FIG. 6 is a diagram according to a fourth embodiment of the disclosure;

DETAILED DESCRIPTION

Embodiments of the disclosure are described as below with reference to the drawings, which include various details of embodiments of the disclosure to facilitate understanding and should be considered as merely exemplary. Therefore, those skilled in the art should realize that various changes and modifications may be made to embodiments described herein without departing from the scope and spirit of the disclosure. Similarly, for clarity and conciseness, descriptions of well-known functions and structures are omitted in the following descriptions.

Figure 1:
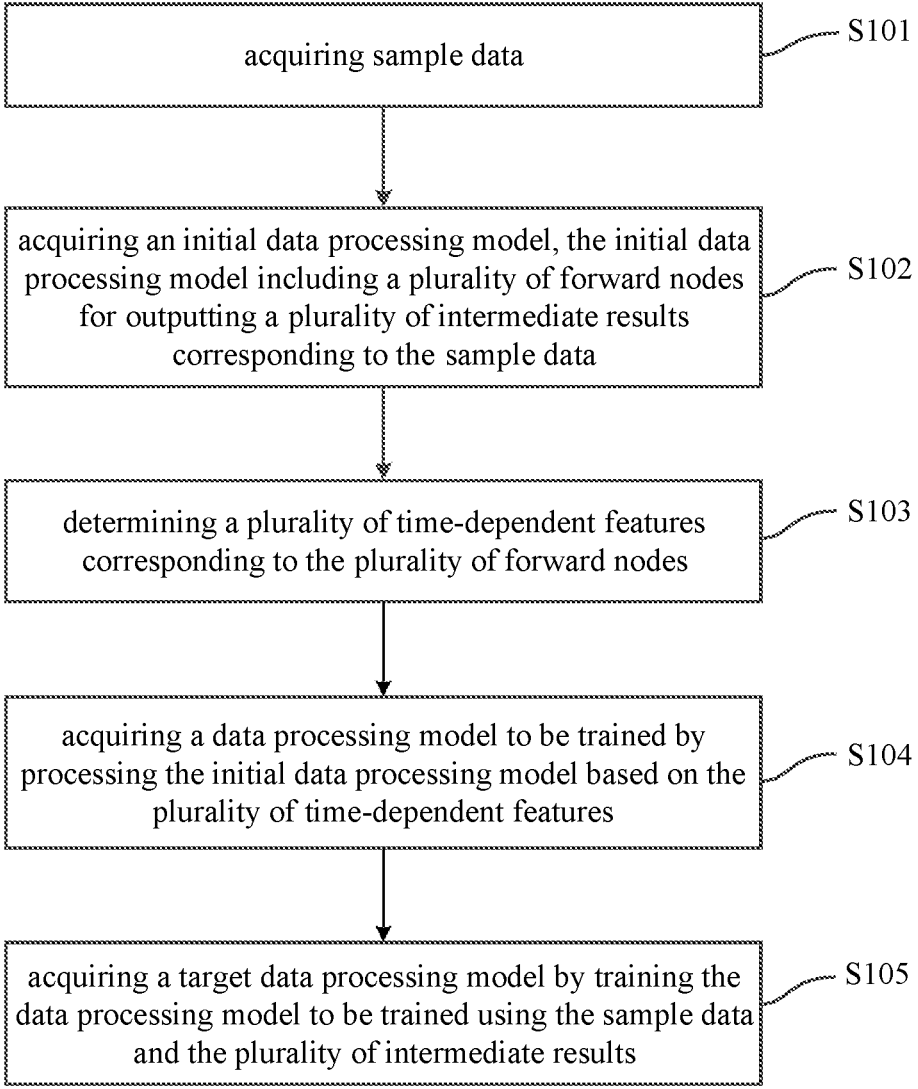
FIG. 1 is a diagram according to a first embodiment of the disclosure.

FIG. 1 is a diagram according to a first embodiment of the disclosure.

It should be noted that, an executive body of a method for training a data processing model in some embodiments is an apparatus for training a data processing model. The apparatus is achieved by means of software and/or hardware and configured in an electronic device . The electronic device includes but not limited to a terminal, a server side, etc.

Some embodiments of the disclosure relate to the field of artificial intelligence (AI) technologies such as deep learning and big data processing.

Artificial Intelligence is a new science technology that studies and develops theories, methods, technologies and application systems for simulating, extending and expanding human intelligence.

Deep learning (DL) learns inherent law and representation hierarchy of sample data and information obtained in the learning process is of great help in interpretation of data such as words, images and sound. The final goal of DL is that the machine has analytic learning ability like human beings, which may recognize data such as words, images and sound.

Big data processing refers to a process of analyzing and processing large-scale data by means of artificial intelligence and big data may be summarized as 5 Vs, that is, volume, velocity, variety, value and veracity.

In some embodiments, the executive body of the method for training the data processing model acquires sample data by means of public, legal and compliant ways, for example, from a set of public data or from a user if the user authorized. The sample data may not reflect personal information of a certain specific user.

It should be noted that, the sample data in some embodiments of the disclosure may be acquired in accordance with the relevant laws and regulations.

As illustrated in FIG. 1, the method for training the data processing model includes the following.

At S101, sample data are acquired.

Data for training the model may be referred to as the sample data. The sample data include sample image data or sample audio data, which are not limited herein.

In some embodiments, when the sample data are acquired, a video stream may be acquired. The video stream may be parsed to obtain a plurality of frames as the sample data or audio data corresponding to the plurality of frames may be parsed as the sample data, which are not limited herein.

There are multiple of pieces of sample data.

It should be noted that, the sample data in some embodiments are not sample data for a certain specific user and may not reflect personal information of a certain specific user.

The sample data in some embodiments may be acquired from a set of public data or the sample data may be acquired by authorization of a user corresponding to the sample data.

At S102, an initial data processing model is acquired, the initial data processing model including a plurality of forward nodes for outputting a plurality of intermediate results corresponding to the sample data.

The data processing model acquired in an initial stage of training may be referred to as the initial data processing model. The initial data processing model may be an artificial intelligence model, for example a neutral network model or a machine learning model. Of course, the initial data processing model may be any other possible model that may perform data processing tasks, which is not limited herein.

In some embodiments of the disclosure, when the sample data are acquired and the initial data processing model is acquired, optimizing a structure of the initial data processing model may be executed, for example, the structure of the initial data processing model is simplified or the structure of the initial data processing model is optimized in any other possible way, assisting in effectively reducing the consumption of the data processing logic on the memory.

The initial data processing model in some embodiments of the disclosure includes the plurality of forward nodes. The forward node may be configured to perform a forward calculation task in the data processing logic, that is, when the sample data are input into the data processing model, the forward calculation tasks are usually performed on the sample data based on the plurality of forward nodes to output the plurality of intermediate results respectively corresponding to the sample data. When the sample data are input into the forward node, the result of the forward calculation task performed on the sample data using the forward node may be referred to as the intermediate result.

When the number of forward nodes is multiple, the plurality of forward nodes may have a certain connection relationship, for example, a sequential connection relationship, so that the plurality of forward nodes perform the forward calculation tasks, which may be a process of sequentially performing forward calculation on the input sample data by the plurality of forward nodes.

In some embodiments, when the sample data are acquired, the initial data processing model may be acquired, that is, a data processing model may be acquired from a preset model library as the initial data processing model. The initial data processing model includes the plurality of forward nodes that may output the plurality of intermediate results corresponding to the sample data in performing the forward calculation tasks.

It should be noted that, the initial data processing model in some embodiments is not a data processing model for a certain specific user and may not reflect personal information of a certain specific user.

At S103, a plurality of time-dependent features corresponding to the plurality of forward nodes are determined.

The time-dependent feature means whether there is a time-dimension calculation association relationship between a corresponding forward node and other forward nodes, that is, whether the corresponding forward node depends on intermediate results output by other forward nodes when performing the forward calculation task. The time-dependent feature may be a dependence on a calculation sequence of different forward nodes or may be a dependence of a calculation association relationship on time dimension within a period of calculation time, which is not limited herein.

For example, when a calculation sequence of forward calculation tasks is 0 to t, t may represent a calculation serial number of a forward node, that is, the forward calculation tasks include calculation at a $0^{th}$ action, calculation at a first action, . . . , and calculation at a $t^{th}$ action, and different forward nodes respectively correspond to different calculation tasks. When a forward node depends on an intermediate result output at a $(t-1)^{th}$ action when performing calculation at a $t^{th}$ action, it may be determined that the time-dependent feature of the forward node is that there is a calculation association relationship between the forward node and other forward nodes; and when a forward node does not depend on an intermediate result output at any other action when performing calculation at a $t^{th}$ block, it may be determined that the time-dependent feature of the forward node is that there is no calculation association relationship between the forward node and other forward nodes.

Figure 2:
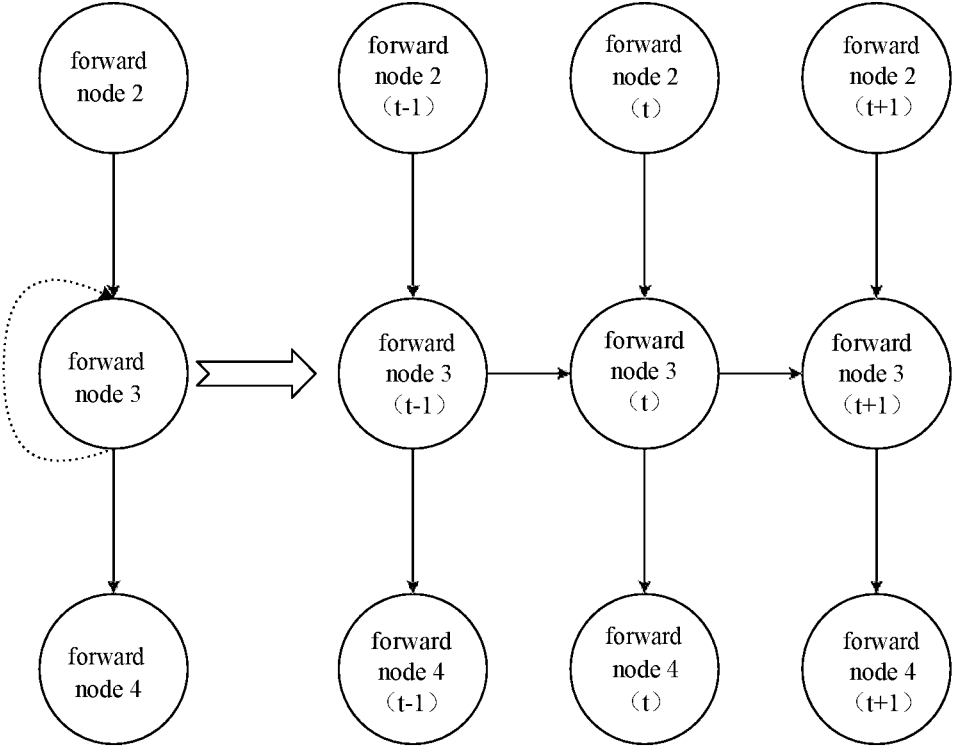
FIG. 2 is a diagram of a time-dependent feature in some embodiments of the disclosure.

As illustrated in FIG. 2, FIG. 2 is a diagram of a time-dependent feature in some embodiments of the disclosure. The plurality of forward nodes include a forward node 2, a forward node 3 and a forward node 4. The calculation sequence of the plurality of forward nodes is the forward node 2, the forward node 3 and the forward node 4, sequentially. Correspondingly, when the forward nodes performs calculations from 0 to t actions, calculations may be performed in a sequence of a $(t-1)^{th}$ action, a $t^{th}$ action and a $(t+1)^{th}$ action. The forward node 3 depends on an intermediate result output at the $(t-1)^{th}$ action when performing calculation at the $t^{th}$ action and depends on an intermediate result output at the $t^{th}$ action when performing calculation at the $(t+1)^{th}$ action. Therefore, it may be determined that the time-dependent feature of the forward node 3 is that there is a time-dimension calculation association relationship between the forward node 3 and other forward nodes. The forward node 2 and the forward node 4 do not depend on an intermediate result output at other any action when performing calculations at the $(t-1)^{th}$ action, the $t^{th}$ action and the $(t+1)^{th}$ action. Therefore, it may be determined that the time-dependent features of the forward node 2 and the forward node 4 are that there is no time-dimension calculation association relationship between the forward node 2 and other forward nodes and between the forward node 4 and other forward nodes.

In some embodiments, when the time-dependent feature corresponding to the forward node is determined, the intermediate result input by the forward node may be acquired and it may analyze whether there is an association relationship between the input intermediate result and the intermediate result output by the calculation task at other actions, thereby analyzing the corresponding time-dependent feature, which is not limited herein.

In some embodiments, when the initial data processing model is acquired, the calculation association relationship of each forward node in the initial data processing model and other forward nodes may be analyzed, to determine the plurality of time-dependent features corresponding to the plurality of forward nodes based on the analyzed calculation association relationship. Or, a configuration file corresponding to the initial data processing model is acquired, the configuration file is parsed to obtain attribute features corresponding to each forward node, and corresponding analysis is performed on the attribute features to obtain the plurality of time-dependent features respectively corresponding to the plurality of forward nodes, which is not limited herein.

At S104, a data processing model to be trained is acquired by processing the initial data processing model based on the plurality of time-dependent features.

The data processing model acquired by optimizing the initial data processing model may be referred to as the data processing model to be trained.

When the plurality of time-dependent features corresponding to the plurality of forward nodes are determined, the data processing model to be trained may be acquired by processing the initial data processing model based on the plurality of time-dependent features.

For example, the initial data processing model may be optimized in combination with the plurality of time-dependent features, to correspondingly update a structure and parameters of the initial data processing model to obtain the optimized initial data processing model. The optimized initial data processing model may be referred to as the data processing model to be trained. Or the initial data processing model is processed based on the plurality of time-dependent features in any other possible way.

At S105, a target data processing model is acquired by training the data processing model to be trained using the sample data and the plurality of intermediate results.

When the data processing model to be trained is acquired by processing the initial data processing model based on the plurality of time-dependent features, the target data processing model may be acquired by training the data processing model to be trained using the sample data and the plurality of intermediate results.

For example, a predicted processing result output by the data processing model to be trained may be acquired by inputting the sample data and the plurality of intermediate results into the data processing model to be trained. When a convergence condition is satisfied between the predicted processing result and an annotated processing result, training is completed, and the trained data processing model is taken as the target data processing model.

In some embodiments, a loss function may be preconfigured for the data processing model to be processed. In the process of training the data processing model, the sample data, the plurality of intermediate results, the predicted processing result and the annotated processing result are taken as input parameters of the loss function, a loss value input by the loss function is determined, and it is determined whether the data processing model satisfies the convergence time in combination with the loss value, which is not limited herein.

It should be noted that the target data processing model acquired includes a data processing logic for the sample data. However, construction of the data processing logic for the sample data is performed when authorized by the user. The construction process conforms to the relevant laws and regulations.

In some embodiments, the sample data are acquired; the initial data processing model is acquired, the initial data processing model including the plurality of forward nodes for outputting the plurality of intermediate results corresponding to the sample data; the plurality of time-dependent features corresponding to the plurality of forward nodes are determined; the data processing model to be trained is acquired by processing the initial data processing model based on the plurality of time-dependent features; and the target data processing model is acquired by training the data processing model to be trained using the sample data and the plurality of intermediate results. Since a structure of the initial data processing model is correspondingly optimized in combination with the time-dependent feature of each forward node, consumption of the data processing logic on a memory may be effectively reduced, thereby effectively enhancing a training efficiency of the data processing model and a processing effect of the data processing model.

FIG. 3 is a diagram according to a second embodiment of the disclosure.

As illustrated in FIG. 3, the method for training the data processing model includes the following.

At S301, sample data are acquired.

It should be noted that, the sample data in some embodiments are not sample data for a certain specific user and may not reflect personal information of a certain specific user.

The sample data in some embodiments may be acquired from a set of public data or the sample data may be acquired by authorization of a user corresponding to the sample data.

At S302, an initial data processing model is acquired, the initial data processing model including a plurality of forward nodes for outputting a plurality of intermediate results corresponding to the sample data.

In some scenes, a check range may further be defined for the initial data processing model, which may include the plurality of forward nodes that may be part of forward nodes in all forward nodes of the initial data processing model. A target forward node may be supported to be screened out from the part of forward nodes, which is not limited herein.

It should be noted that, the initial data processing model in some embodiments is not a data processing model for a certain specific user and may not reflect personal information of a certain specific user.

At S303, a plurality of time-dependent features corresponding to the plurality of forward nodes are determined.

The explanation of S301 to S303 may refer to the above embodiments, which will not be repeated herein.

At S304, a target forward node is determined from the plurality of forward nodes based on the plurality of time-dependent features.

In a calculation process, a forward node having no time-dimension association relationship with other forward nodes may be referred to as the target forward node.

When the plurality of time-dependent features corresponding to the plurality of forward nodes are determined, the forward node having no time-dimension association relationship with other forward nodes may be determined from the plurality of forward nodes based on the plurality of time-dependent features and taken as the target forward node.

Figure 4:
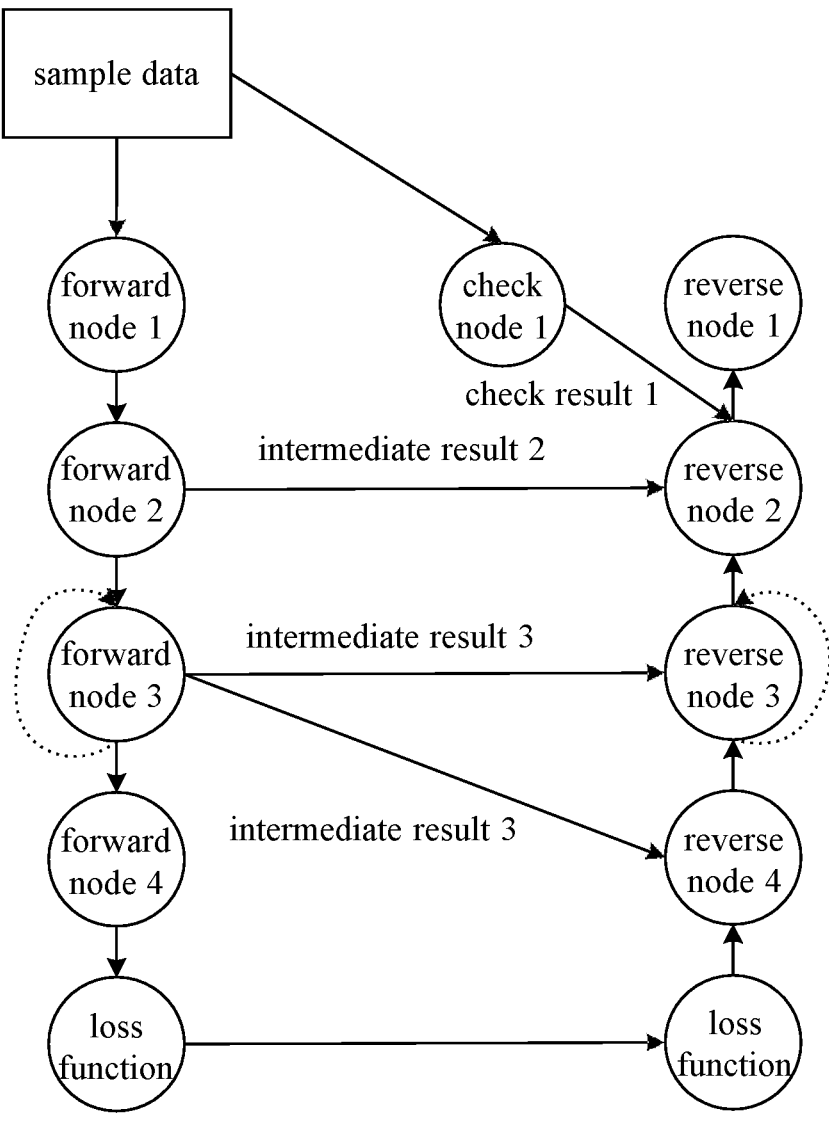
FIG. 4 is a diagram of another time-dependent feature in some embodiments of the disclosure.

Some embodiments may be described in combination with FIG. 4. As illustrated in FIG. 4, FIG. 4 is a diagram of another time-dependent feature in some embodiments of the disclosure. It may include a forward node 1, a forward node 2, a forward node 3 and a forward node 4. By determining time-dependent features of the forward node 1, the forward node 2, the forward node 3 and the forward node 4, the time-dependent feature of the forward node 1 is that there is no time-dimension calculation association relationship with other forward nodes. In this case, the forward node 1 may be determined as the target forward node.

In some embodiments, by determining dependent features corresponding to the plurality of forward nodes, the target forward node having no time-dimension calculation association relationship with other forward nodes may be determined from the plurality of forward nodes, and a check state may be set for the target forward node (that is, a corresponding check node 1 is configured for the target forward node 1, as illustrated in FIG. 4), to obtain a check result output by the target forward node. A data processing model to be trained may be trained using the sample data, the plurality of intermediate results and the check result to obtain a target data processing model.

When the target forward node is set to the check state, it indicates that when reverse calculation of the model is performed, if a reverse node depends on an intermediate result output by the target forward node, a check task may be performed using the corresponding check node to output the intermediate result corresponding to the target forward node, so as to assist in tuning parameters of the model.

At S305, a check node corresponding to the target forward node is generated, the check node being configured to output a check result corresponding to the sample data, the check result being the same as an intermediate result output by the target forward node.

When the target forward node is determined from the plurality of forward nodes based on the plurality of time-dependent features, the check node corresponding to the target forward node may be generated.

In a process of performing reverse training on the data processing model, the check task may be re-performed by the check node on the sample data to generate the intermediate result corresponding to the target forward node, and the intermediate result obtained by check may be configured to support reverse training of the data processing model. The purpose of reverse training may be tuning model parameters.

The intermediate result output by the check node in the check process may be referred to as the check result, and the check result output by the check node in the check process is the same as the intermediate result output by the target forward node in a forward training process.

In some embodiments, by calculating a check and memory comprehensive benefit for forward nodes, a check node corresponding to a forward node with the maximum check and memory comprehensive benefit may be generated. The specific calculating formula is as follows: recommit_benefit=output_size−input_size+recompute_input_size, in which, recommit_benefit is a check and memory comprehensive benefit, output_size is a memory size of an intermediate result output by a forward node, input_size is a memory size of all inputs for a forward node, recompute_input_size is a memory size of an input for a target forward node, to determine a calculation node with the maximum check and memory comprehensive benefit in the target forward node, and generate a check node corresponding to the above calculation node. The above actions are repeated until the obtained maximum check and memory comprehensive benefit value is less than a preset threshold. Otherwise, when the calculated check and memory comprehensive benefit value is greater than the preset threshold, the check node corresponding to the target forward node may not be generated.

For example, as illustrated in FIG. 4, when the target forward node determined is the forward node 1, a check and memory comprehensive benefit is calculated for the target node 1. When the check and memory comprehensive benefit calculated for the forward node 1 is less than a preset threshold, the check node corresponding to the target forward node 1 is generated and the forward node 1 may output the check result 1 in the check process, the check result 1 being the same as the intermediate result 1 output by the forward node 1 in the forward calculation. Otherwise, when the check and memory comprehensive benefit calculated for the forward node 1 is greater than the preset threshold, the check node of the target forward node may not be generated. In this case, the check node may be re-determined by subsequent calculation, which is not limited herein.

At S306, a data processing model to be trained is generated based on the plurality of forward nodes and the check node.

When the check node corresponding to the target forward node is generated, the data processing model to be trained may be generated based on the plurality of forward nodes and the check node.

In some embodiments, the target forward node is determined from the plurality of forward nodes based on the plurality of time-dependent features; the check node corresponding to the target forward node is generated, the check node being configured to output the check result corresponding to the sample data, the check result being the same as the intermediate result output by the target forward node; and the data processing model to be trained is generated based on the plurality of forward nodes and the check node, thereby optimizing the structure of the initial data processing model with reference to the time-dependent features. Since the corresponding check node is configured to perform the check task, the check result obtained by check may be supported to perform parameter tuning on the data processing model, which effectively reduces the dependence on the intermediate result output by the target forward node.

It should be noted that the data processing model to be trained acquired at the action includes a data processing logic for the sample data. However, construction of the data processing logic for the sample data is performed when authorized by the user. The construction process conforms to the relevant laws and regulations.

At S307, a target data processing model is acquired by training the data processing model to be trained using the sample data, other intermediate results and the check result; in which the other intermediate results are intermediate results corresponding to the sample data output by other forward nodes, and the target forward node and the other forward nodes constitute the plurality of forward nodes.

When the data processing model to be trained is generated based on the plurality of forward nodes and the check node, the sample data, the other intermediate results and the check result may be configured to train the data processing model to be trained, to obtain the target data processing model. Since the data processing model to be trained is trained in combination with the sample data, the other intermediate results and the check result, training efficiency and performance of the data processing model may be effectively enhanced and training effect of the data processing model may be effectively enhanced, so that the data processing model is adapted to an application scene with the higher in-time requirement.

Some embodiments may be illustrated in combination with FIG. 4. As illustrated in FIG. 4, the data processing model includes a forward node 1, a forward node 2, a forward node 3, a forward node 4, a reverse node 1, a reverse node 2, a reverse node 3 and a reverse node 4. When the check node 1 and the check result 1 are determined, the data processing model to be trained may be trained in combination with the check result, the sample data, the intermediate result 2 output by the forward node 2 and the intermediate result 3 output by the forward node 3, to perform parameter tuning on the data processing model to obtain the target data processing model.

In some embodiments, corresponding loss functions may be configured for the forward node and the reverse node, respectively. Therefore, a loss value output by the loss function configured for the forward node is acquired in the process of calculating the forward node. The intermediate result 2 is taken as an input of the reverse node 2, the intermediate result 3 is taken as an input of the reverse node 3 and an input of the reverse node 4, and the check result 1 is taken as an input of the reverse node 1. By performing reverse calculation of the reverse node (reverse calculation is configured to perform parameter tuning on the model), a descent gradient of the model is calculated based on the loss function configured for the reverse node, and the descent gradient is applied to model parameters to obtain updated training parameters of the model, and the updated training parameters of the model may be compared with standard training parameters preset for the model to determine whether the model has been trained.

In some embodiments, the sample data are acquired; the initial data processing model is acquired, the initial data processing model including the plurality of forward nodes for outputting the plurality of intermediate results corresponding to the sample data; the plurality of time-dependent features corresponding to the plurality of forward nodes are determined; the data processing model to be trained is acquired by processing the initial data processing model based on the plurality of time-dependent features; and the target data processing model is acquired by training the data processing model to be trained using the sample data and the plurality of intermediate results. Since a structure of the initial data processing model is correspondingly optimized in combination with the time-dependent feature of each forward node, consumption of the data processing logic on a memory may be effectively reduced, thereby effectively enhancing a training efficiency of the data processing model and a processing effect of the data processing model. The target forward node is determined from the plurality of forward nodes based on the plurality of time-dependent features; the check node corresponding to the target forward node is generated, the check node being configured to output the check result corresponding to the sample data, the check result being the same as the intermediate result output by the target forward node; and the data processing model to be trained is generated based on the plurality of forward nodes and the check node, thereby optimizing the structure of the initial data processing model with reference to the time-dependent features. Since the corresponding check node is configured to perform the check task, the check result obtained by check may be supported to perform parameter tuning on the data processing model, which effectively reduces the dependence on the intermediate result output by the target forward node.

FIG. 5 is a diagram according to a third embodiment of the disclosure.

As illustrated in FIG. 5, the method for training the data processing model includes the following.

At S501, the plurality of intermediate results output by the plurality of forward nodes in the data processing model to be trained are acquired by taking the sample data as a forward training input of the data processing model to be trained.

In some embodiments, by inputting the sample data into the data processing model to be trained and performing forward calculation tasks based on the plurality of forward nodes in the data training model to be trained (the forward calculation task may be configured to perform a data processing task), the plurality of intermediate results output by the plurality of forward nodes are acquired, in which the intermediate results may be configured as an input of reverse calculation tasks, and the reverse calculation tasks may be regarded as model parameter tuning tasks.

It should be noted that, the sample data in some embodiments are not sample data for a certain specific user and may not reflect personal information of a certain specific user.

The sample data in some embodiments may be acquired from a set of public data or the sample data may be acquired by authorization of a user corresponding to the sample data.

At S502, the intermediate result output by the target forward node is deleted, and the other intermediate results output by the other forward nodes are retained.

When the plurality of intermediate results of the data processing model to be trained are acquired by taking the sample data as the forward training input of the data processing model to be trained, the intermediate result output by the target forward node may be deleted, and the other intermediate results output by the other forward nodes may be retained.

For example, the forward node 1, the forward node 2, the forward node 3 and the forward node 4 respectively output an intermediate result 1, an intermediate result 2, an intermediate result 3 and an intermediate result 4, relevant with the sample data in forward training. When the forward node 1 is determined as the target forward node, the intermediate result 1 output by the forward node 1 may be deleted, and the intermediate result 2, the intermediate result 3 and the intermediate result 4 may be retained as the other intermediate results.

In some embodiments, when the plurality of intermediate results output by the plurality of forward nodes in the data processing model to be trained are acquired by taking the sample data as the forward training input of the data processing model to be trained, the intermediate result output by the target forward node may be deleted, and the other intermediate results output by the other forward nodes may be retained. Therefore, continuous occupation on the memory in the subsequent data training process, of the intermediate result output by the target forward node, may be avoided, which enhances storage performance, thereby assisting in enhancing the training speed of the data processing model.

At S503, the check result corresponding to the sample data, generated by the check node, is acquired.

That is, when reverse calculation tasks are performed on the plurality of reverse nodes in the data processing model to be trained (the reverse calculation task may be regarded as a model parameter tuning task), the check node may be configured to perform the check task, to output the intermediate result corresponding to the sample data (the intermediate result output by the check node may be referred to as the check result).

At S504, the predicted tuning parameters output by the plurality of reverse nodes, are acquired, by taking the sample data, the other intermediate results, and the check result as a reverse training input of the data processing model to be trained.

When the check result corresponding to the sample data, generated by the check node, is acquired, the sample data, the other intermediate calculation results, and the check result may be taken as the reverse training input of the data processing model to be trained to obtain the predicted tuning parameters output by the plurality of reverse nodes.

The tuning parameter predicted by the reverse node may be referred to as the predicted tuning parameter, and the predicted tuning parameter may be a parameter for reflecting a model training state and may be predicted. Correspondingly, when the model is trained, the data processing model to be trained may have corresponding initial tuning parameters, and the initial tuning parameters may be tuning parameters to be adjusted. In the reverse training process, reverse calculation tasks may be performed to tune the tuning parameters to be adjusted of the model. In this case, the reverse node may generate the corresponding predicted tuning parameter.

In some embodiments, a loss function may be preconfigured for the data processing model. In the process of performing the reverse node, a descent gradient of training parameters of the data processing model may be calculated based on the preconfigured loss function, and the descent gradient may be applied to model training parameters by updating parameters, to obtain updated predicted tuning parameters.

At S505, the trained data processing model is taken as the target data processing model in response to the predicted tuning parameters and the annotated tuning parameters satisfying a preset condition.

A performance index is preconfigured for the data processing model, and target tuning parameters of the data processing model, parsed based on the performance index, may be referred to as the annotated tuning parameters.

In some embodiments, corresponding annotated tuning parameters may be preset for the data processing model, and a loss function is preconfigured for the data processing model. In the reverse training process of the data processing model, parameter updating is performed to obtain updated predicted tuning parameters, and when the loss value between the predicted tuning parameters and the annotated optimal parameters is less than the loss threshold, it may be determined that it satisfies the preset condition between the predicted tuning parameters and the annotated tuning parameters. In this case, the tuning parameters to be adjusted may be adjusted based on the predicted tuning parameters to obtain the target data processing model, or the preset condition may be configured as any other possible condition, which is not limited herein.

In some embodiments, the check result corresponding to the sample data, generated by the check node, is acquired, and the sample data, the other intermediate calculation results, and the check result are taken as the reverse training input of the data processing model to be trained to obtain the predicted tuning parameters output by the plurality of reverse nodes. The trained data processing model is taken as the target data processing model in response to the predicted tuning parameters and the annotated tuning parameters satisfying the preset condition. Since the reverse calculation tasks are performed in combination with the sample data, the other intermediate results and the check result to perform parameter tuning on the data, performance of the data processing model may be effectively enhanced, training efficiency and performance of the data processing model may be ensured, and training effect of the data processing model may be effectively enhanced, so that the data processing model is adapted to an application scene with the higher in-time requirement, which greatly enriches model training and application scenes.

The data processing model trained may be effectively applied to a streaming computing scene, which effectively enhances the usability and intelligence of check optimization and reduces the use threshold of the user, to achieve the purpose of increasing the batch size of sample data and ensuring the computing speed, so that a data processing algorithm may be quickly trained in the production environment, to improve the delivery efficiency of the data processing model.

It should be noted that the target data processing model acquired at the action includes a data processing logic for the sample data. However, construction of the data processing logic for the sample data is performed when authorized by a user. The construction process conforms to the relevant laws and regulations.

In some embodiments, when the plurality of intermediate results output by the plurality of forward nodes in the data processing model to be trained are acquired by taking the sample data as the forward training input of the data processing model to be trained, the intermediate result output by the target forward node may be deleted, and the other intermediate results output by the other forward nodes may be retained; and the check result corresponding to the sample data, generated by the check node, may be acquired. Therefore, continuous occupation of a memory in the subsequent data training process, of the intermediate result output by the target forward node, may be avoided, which enhances storage performance, thereby assisting in enhancing the training speed of the data processing model. The check result corresponding to the sample data, generated by the check node, is acquired, and the sample data, the other intermediate calculation results, and the check result are taken as the reverse training input of the data processing model to be trained to obtain the predicted tuning parameters output by the plurality of reverse nodes. The trained data processing model is taken as the target data processing model in response to the predicted tuning parameters and the annotated tuning parameters satisfying the preset condition. Since the reverse calculation tasks are performed in combination with the sample data, the other intermediate results and the check result to perform parameter tuning on the data, performance of the data processing model may be effectively enhanced, training efficiency and performance of the data processing model may be ensured, and training effect of the data processing model may be effective enhanced, so that the data processing model is adapted to an application scene with the higher in-time requirement, which greatly enriches model training and application scenes.

FIG. 6 is a diagram according to a fourth embodiment of the disclosure.

In some embodiments, an executive body of the method for processing data may acquire data to be processed by means of public, legal and compliant ways, for example, from a set of public data or from a user if the user authorized. The data to be processed may not reflect personal information of a certain specific user.

It should be noted that, the data to be processed in some embodiments of the disclosure may be acquired in accordance with the relevant laws and regulations.

As illustrated in FIG. 6, the method for processing data includes the following.

At S601, data to be processed are acquired.

The current data to be processed may be referred to as the data to be processed.

The data to be processed may be for example one segment of speech data frames or a plurality segments of speech data frames, that is, the number of data to be processed may be one or more, which is not limited herein.

It should be noted that, the sample data in some embodiments of the disclosure may be acquired in accordance with the relevant laws and regulations.

At S602, a data processing result output by the target data processing model is acquired by inputting the data to be processed into the target data processing model trained by the method for training the data processing model.

When the data to be processed are acquired, the data processing result output by the target data processing model may be acquired by inputting the data to be processed into the target data processing model trained by the method for training the data processing model.

In some embodiments, the data processing result output by the target data processing model may be acquired by acquiring the data to be processed and inputting the data to be processed into the target data processing model trained by the method for training the data processing model. Since the target data processing model is trained by optimizing the structure of the initial data processing model in combination with the time-dependent features of the forward nodes, when the data to be processed are processed by the target data processing model, consumption of a memory by the data processing logic may be effectively reduced, thereby effectively enhancing the data processing efficiency and the data processing effect.

Figure 7:
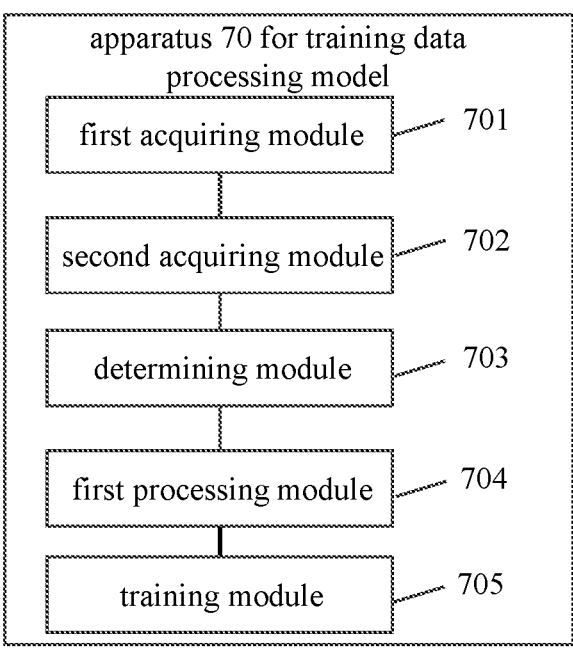
FIG. 7 is a diagram according to a fifth embodiment of the disclosure.

FIG. 7 is a diagram according to a fifth embodiment of the disclosure.

As illustrated in FIG. 7, the apparatus 70 for training the data processing model includes a first acquiring module 701, a second acquiring module 702, a determining module 703, a first processing module 704 and a training module 705.

The first acquiring module 701 is configured to acquire sample data.

The second acquiring module 702 is configured to acquire an initial data processing model, the initial data processing model including a plurality of forward nodes for outputting a plurality of intermediate results corresponding to the sample data.

The determining module 703 is configured to determine a plurality of time-dependent features corresponding to the plurality of forward nodes.

The first processing module 704 is configured to acquire a data processing model to be trained by processing the initial data processing model based on the plurality of time-dependent features.

The training module 705 is configured to acquire a target data processing model by training the data processing model to be trained using the sample data and the plurality of intermediate results.

Figure 8:
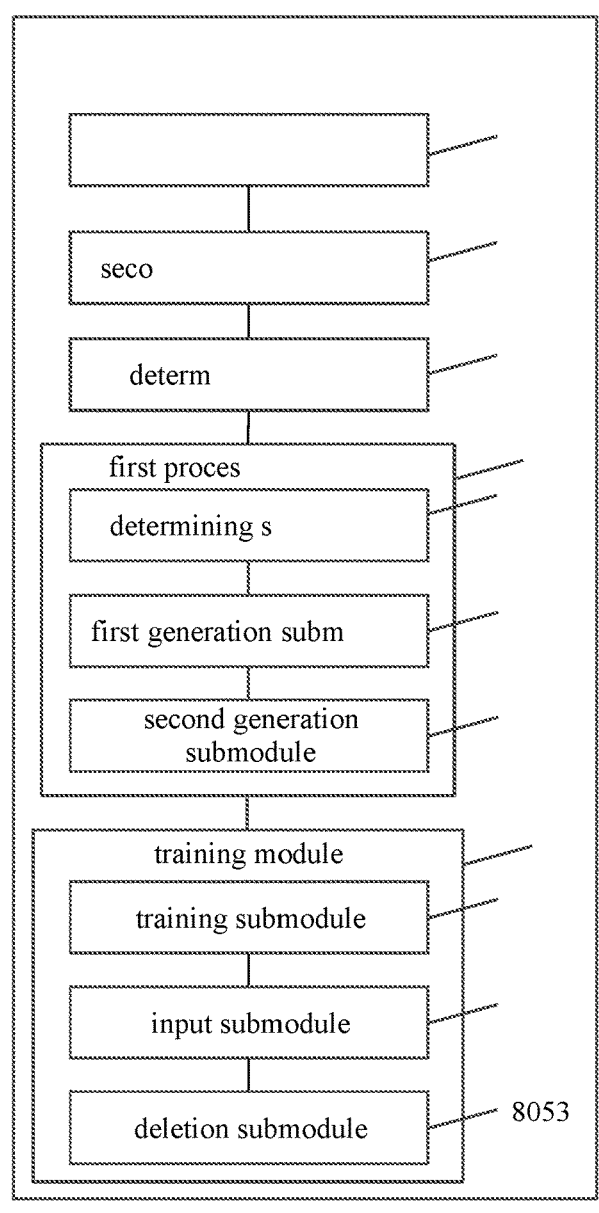
FIG. 8 is a diagram according to a sixth embodiment of the disclosure.

In some embodiments of the disclosure, as illustrated in FIG. 8, FIG. 8 is a diagram illustrating a sixth embodiment of the disclosure. The apparatus 80 for training the image processing model includes a first acquiring module 801, a second acquiring module 802, a determining module 803, a first processing module 804 and a training module 805. The first processing module includes a determining submodule 8041, a first generation submodule 8042, and a second generation submodule 8043.

The determining submodule 8041 is configured to determine a target forward node from the plurality of forward nodes based on the plurality of time-dependent features.

The first generation submodule 8042 is configured to generate a check node corresponding to the target forward node, the check node being configured to output a check result corresponding to the sample data, the check result being the same as an intermediate result output by the target forward node.

The second generation submodule 8043 is configured to generate the data processing model to be trained based on the plurality of forward nodes and the check node.

In some embodiments of the disclosure, the training module 805 includes a training submodule 8051.

The training submodule 8051 is configured to acquire the target data processing model by training the data processing model to be trained using the sample data, other intermediate results and the check result; in which the other intermediate results are intermediate results corresponding to the sample data output by other forward nodes, and the target forward node and the other forward nodes constitute the plurality of forward nodes.

In some embodiments, the training module 805 further includes an input submodule 8052 and a deletion submodule 8053.

The input submodule 8052 is configured to acquire the plurality of intermediate results output by the plurality of forward nodes in the data processing model to be trained by taking the sample data as a forward training input of the data processing model to be trained.

The deletion submodule 8053 is configured to delete the intermediate calculation result output by the target forward node, and retain the other intermediate results output by the other forward nodes.

In some embodiments of the disclosure, the data processing model to be trained includes a plurality of reverse nodes for outputting predicted tuning parameters corresponding to the sample data, the sample data having corresponding annotated tuning parameters. The training submodule 8051 is configured to: acquire the check result corresponding to the sample data, generated by the check node; acquire the predicted tuning parameters output by the plurality of reverse nodes by taking the sample data, the other intermediate results, and the check result as a reverse training input of the data processing model to be trained; and take the trained data processing model as the target data processing model in response to the predicted tuning parameters and the annotated tuning parameters satisfying a preset condition.

In some embodiments of the disclosure, the time-dependent feature of the target forward node indicates that there is no time-dimension calculation association relationship between the target forward node and other forward nodes.

It may be understood that, the apparatus 80 for training the data processing model in FIG. 8 of some embodiments and the apparatus 70 for training the data processing model in the above embodiments, the first acquiring module 801 and the first acquiring module 701, the second acquiring module 802 and the second acquiring module 702, the determining module 803 and the determining module 703, the first processing module 804 and the first processing module 704, the training module 805 and the training module 705 may have the same functions and structures.

It needs to be noted that the foregoing explanation of the method for training the data processing model is also applied to the apparatus for training the data processing model in some embodiments.

In some embodiments, the sample data are acquired; the initial data processing model is acquired, the initial data processing model including the plurality of forward nodes for outputting the plurality of intermediate results corresponding to the sample data; the plurality of time-dependent features corresponding to the plurality of forward nodes are determined; the data processing model to be trained is acquired by processing the initial data processing model based on the plurality of time-dependent features; and the target data processing model is acquired by training the data processing model to be trained using the sample data and the plurality of intermediate results. Since a structure of the initial data processing model is correspondingly optimized in combination with the time-dependent feature of each forward node, consumption of the data processing logic on a memory may be effectively reduced, thereby effectively enhancing a training efficiency of the data processing model and a processing effect of the data processing model.

Figure 9:
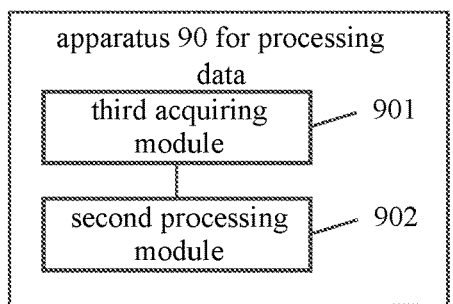
FIG. 9 is a diagram according to a seventh embodiment of the disclosure.

FIG. 9 is a diagram according to a seventh embodiment of the disclosure.

As illustrated in FIG. 9, the apparatus 900 for processing data may include a third acquiring module 901 and a second processing module 902.

The third acquiring module 901 is configured to acquire data to be processed.

The second processing module 902 is configured to acquire a data processing result output by inputting the data to be processed into the target data processing model trained by the apparatus for training a data processing model.

It should be noted that the foregoing explanation of the method for processing data is also applied to the apparatus for processing data in some embodiments, which will not be repeated herein.

In some embodiments, the data processing result output by the target data processing model may be acquired by acquiring the data to be processed and inputting the data to be processed into the target data processing model trained by the method for training the data processing model. Since the target data processing model is trained by optimizing the structure of the initial data processing model in combination with the time-dependent features of the forward nodes, when the data to be processed are processed by the target data processing model, consumption of a memory by the data processing logic may be effectively reduced, thereby effectively enhancing the data processing efficiency and the data processing effect.

According to some embodiments of the disclosure, the disclosure further provides an electronic device, a readable storage medium and a computer program product.

Figure 10:
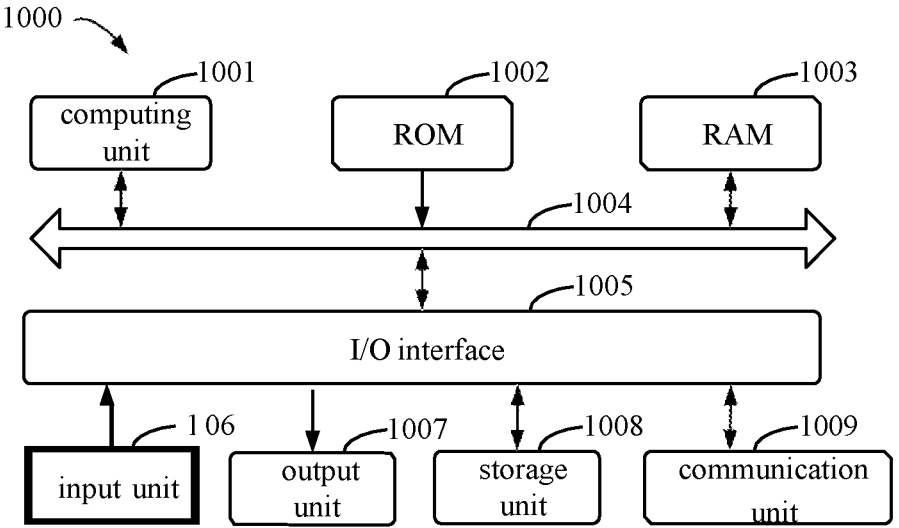
FIG. 10 illustrates a schematic block diagram of an exemplary electronic device configured to execute a method for training a data processing model in some embodiments of the disclosure.

FIG. 10 illustrates a schematic block diagram of an exemplary electronic device configured to execute the method for training the data processing model in some embodiments of the disclosure. An electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 10, the device 1000 includes a computing unit 1001, which may execute various appropriate actions and processing based on a computer program stored in a read-only memory (ROM) 1002 or a computer program loaded into a random access memory (RAM) 1003 from a storage unit 1008. In the RAM 1003, various programs and data required for operation of the device 1000 may also be stored. The computing unit 1001, the ROM 1002, and the RAM 1003 are connected to each other through a bus 1004. An input/output (I/O) interface 1005 is also connected to a bus 1004.

Several components in the device 1000 are connected to the I/O interface 1005, and include: an input unit 1006, for example, a keyboard, a mouse, etc.; an output unit 1007, for example, various types of displays, speakers, etc.; a storage unit 1008, for example, a magnetic disk, an optical disk, etc.; and a communication unit 1009, for example, a network card, a modem, a wireless communication transceiver, etc. The communication unit 1009 allows a device 1000 to exchange information/data through a computer network such as internet and/or various types of telecommunication networks and other devices.

The computing unit 1001 may be various general-purpose and/or special-purpose processing components with processing and computing capacities. Some examples of the computing unit 1001 include but not limited to a central processing unit (CPU), a graphs processing unit (GPU), various dedicated artificial intelligence (AI) computing chips, various computing units running a machine learning model algorithm, a digital signal processor (DSP), and any appropriate processor, controller, microcontroller, etc. The computing unit 1001 executes various methods and processings as described above, for example, a method for training a data processing model or a method for processing data. For example, in some embodiments, the method for training a data processing model or the method for processing data may be achieved as a computer software program, which is physically contained in a machine readable medium, such as a storage unit 1008. In some embodiments, a part or all of the computer program may be loaded and/or installed on the device 1000 via a ROM 1002 and/or a communication unit 1009. When the computer program is loaded on a RAM 1003 and executed by a computing unit 1001, one or more blocks in the method for training the data processing model or the method for processing data may be performed. Alternatively, in other embodiments, the computing unit 1001 may be configured to perform a method for training a data processing model or the method for processing data in other appropriate ways (for example, by virtue of a firmware).

Various implementation modes of the systems and technologies described above may be achieved in a digital electronic circuit system, a field programmable gate array (FPGA), an application-specific integrated circuit (ASIC), an application specific standard product (ASSP), a system-on-chip (SOC) system, a complex programmable logic device, a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the disclosure may be written with one or any combination of a plurality of programming languages. The programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be performed completely or partly on the machine, performed partly on the machine as an independent software package and performed partly or completely on the remote machine or server.

In the context of the disclosure, a machine-readable medium may be a tangible medium that may contain or store a program intended for use in or in conjunction with an instruction execution system, apparatus, or device. A machine readable medium may be a machine readable signal medium or a machine readable storage medium. A machine readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an erasable programmable read-only memory (an EPROM or a flash memory), an optical fiber device, and a portable optical disk read-only memory (CDROM), an optical storage device, a magnetic storage device, or any appropriate combination of the above.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a speech input, or a tactile input).

The systems and technologies described herein may be implemented in a computing system including back-end components (for example, as a data server), or a computing system including middleware components (for example, an application server), or a computing system including front-end components (for example, a user computer with a graphic user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), an internet and a blockchain network.

The computer system may include a client and a server. The client and server are generally far away from each other and generally interact with each other through a communication network. The relationship between the client and the server is generated by computer programs running on the corresponding computer and having a client-server relationship with each other. A server may be a cloud server, also known as a cloud computing server or a cloud host, is a host product in a cloud computing service system, to solve the shortcomings of large management difficulty and weak business expansibility existed in the conventional physical host and Virtual Private Server (VPS) service. A server further may be a server with a distributed system, or a server in combination with a blockchain.

It should be understood that, various forms of procedures shown above may be configured to reorder, add or delete blocks. For example, blocks described in the disclosure may be executed in parallel, sequentially, or in different orders, as long as the desired result of the technical solution disclosed in the disclosure may be achieved, which will not be limited herein.

The above specific implementations do not constitute a limitation on the protection scope of the disclosure. Those skilled in the art should understand that various modifications, combinations, sub-combinations and substitutions may be made according to design requirements and other factors. Any modification, equivalent replacement, improvement, etc., made within the spirit and principle of embodiments of the disclosure shall be included within the protection scope of the disclosure.

What is claimed is:

1. A method for processing audio data, executed by an electronic device, comprising:

acquiring sample audio data;

acquiring an initial audio data processing model, the initial audio data processing model comprising a plurality of forward nodes for outputting a plurality of intermediate results corresponding to the sample audio data;

determining a plurality of time-dependent features corresponding to the plurality of forward nodes, wherein the time-dependent feature of the forward node indicates whether there is a time-dimension calculation association relationship between a target forward node and other forward nodes;

acquiring the audio data processing model to be trained by processing the initial audio data processing model based on the plurality of time-dependent features;

acquiring a target audio data processing model by training the audio data processing model to be trained using the sample audio data and the plurality of intermediate results, acquiring audio data to be processed; and acquiring an audio data processing result output by inputting the audio data to be processed into the target audio data processing model, wherein acquiring the audio data processing model to be trained by processing the initial audio data processing model based on the plurality of time-dependent features, comprising:

determining the target forward node from the plurality of forward nodes based on the plurality of time-dependent features;

generating a check node corresponding to the target forward node, the check node being configured to output a check result corresponding to the sample audio data, the check result being the same as an intermediate result output by the target forward node; and generating the audio data processing model to be trained based on the plurality of forward nodes and the check node, wherein generating the check node corresponding to the target forward node comprises:

determining a check and memory comprehensive benefit value for the target forward node based on a fomula, wherein the formula is recommit_benefit=output_size−input size+recompute_input_size, in which recommit_benefit is the check and memory comprehensive benefit value, output_size is a memory size of an intermediate result output by the target forward node, input_size is a memory size of all inputs for the target forward node, recompute_input_size is a memory size of an input for the target forward node during a reverse calculation of the model process.

2. The method of claim 1, wherein, acquiring the target audio data processing model by training the audio data processing model to be trained using the sample audio data and the plurality of intermediate results, comprising:

acquiring the target audio data processing model by training the audio data processing model to be trained using the sample audio data, other intermediate results and the check result;

wherein, the other intermediate results are intermediate results corresponding to the sample audio data output by other forward nodes, and the target forward node and the other forward nodes constitute the plurality of forward nodes.

3. The method of claim 2, further comprising:

acquiring the plurality of intermediate results output by the plurality of forward nodes in the audio data processing model to be trained by taking the sample audio data as a forward training input of the audio data processing model to be trained; and deleting the intermediate result output by the target forward node, and retaining the other intermediate results output by the other forward nodes.

4. The method of claim 3, wherein the audio data processing model to be trained comprises a plurality of reverse nodes for outputting predicted tuning parameters corresponding to the sample audio data, the sample audio data having corresponding annotated tuning parameters, wherein, acquiring the target audio data processing model by training the audio data processing model to be trained using the sample audio data, the other intermediate results and the check result, comprises:

acquiring the check result corresponding to the sample audio data, generated by the check node;

acquiring the predicted tuning parameters output by the plurality of reverse nodes by taking the sample audio data, the other intermediate results, and the check result as a reverse training input of the audio data processing model to be trained; and taking the trained audio data processing model as the target audio data processing model in response to the predicted tuning parameters and the annotated tuning parameters satisfying a preset condition.

5. The method of claim 1, wherein, the time-dependent feature of the target forward node indicates that there is no time-dimension calculation association relationship between the target forward node and other forward nodes.

6. An electronic device, comprising:

at least one processor; and a memory communicatively connected to the at least one processor; wherein, the memory is configured to store instructions executable by the at least one processor, and when the instructions are performed by the at least one processor, the at least one processor is caused to perform:

acquiring sample audio data;

acquiring an initial audio data processing model, the initial audio data processing model comprising a plurality of forward nodes for outputting a plurality of intermediate results corresponding to the sample audio data;

determining a plurality of time-dependent features corresponding to the plurality of forward nodes, wherein the time-dependent feature of the forward node indicates whether there is a time-dimension calculation association relationship between a target forward node and other forward nodes;

acquiring an audio data processing model to be trained by processing the initial audio data processing model based on the plurality of time-dependent features; and acquiring a target audio data processing model by training the audio data processing model to be trained using the sample audio data and the plurality of intermediate results, acquiring audio data to be processed; and acquiring an audio data processing result output by inputting the audio data to be processed into the target audio data processing model, wherein when the instructions are performed by the at least one processor, the at least one processor is caused to perform:

determining the target forward node from the plurality of forward nodes based on the plurality of time-dependent features;

generating a check node corresponding to the target forward node, the check node being configured to output a check result corresponding to the sample audio data, the check result being the same as an intermediate result output by the target forward node; and generating the audio data processing model to be trained based on the plurality of forward nodes and the check node, wherein when the instructions are performed by the at least one processor, the at least one processor is caused to perform:

determining a check and memory comprehensive benefit value for the target forward node based on a fomula, wherein the formula is recommit_benefit=output_size−input_size+recompute_input_size, in which recommit_benefit is the check and memory comprehensive benefit value, output_size is a memory size of an intermediate result output by the target forward node, input_size is a memory size of all inputs for the target forward node, recompute_input_size is a memory size of an input for the target forward node during a reverse calculation of the model process.

7. The electronic device of claim 6, wherein when the instructions are performed by the at least one processor, the at least one processor is caused to perform:

acquiring the target audio data processing model by training the audio data processing model to be trained using the sample audio data, other intermediate results and the check result;

wherein, the other intermediate results are intermediate results corresponding to the sample audio data output by other forward nodes, and the target forward node and the other forward nodes constitute the plurality of forward nodes.

8. The electronic device of claim 7, wherein when the instructions are performed by the at least one processor, the at least one processor is caused to perform:

acquiring the plurality of intermediate results output by the plurality of forward nodes in the audio data processing model to be trained by taking the sample audio data as a forward training input of the audio data processing model to be trained; and deleting the intermediate result output by the target forward node, and retaining the other intermediate results output by the other forward nodes.

9. The electronic device of claim 8, wherein the audio data processing model to be trained comprises a plurality of reverse nodes for outputting predicted tuning parameters corresponding to the sample audio data, the sample audio data having corresponding annotated tuning parameters, wherein when the instructions are performed by the at least one processor, the at least one processor is caused to perform:

acquiring the check result corresponding to the sample audio data, generated by the check node;

acquiring the predicted tuning parameters output by the plurality of reverse nodes by taking the sample audio data, the other intermediate results, and the check result as a reverse training input of the audio data processing model to be trained; and taking the trained audio data processing model as the target audio data processing model in response to the predicted tuning parameters and the annotated tuning parameters satisfying a preset condition.

10. The electronic device of claim 6, wherein, the time-dependent feature of the target forward node indicates that there is no time-dimension calculation association relationship between the target forward node and other forward nodes.

11. The electronic device of claim 6, wherein when the instructions are performed by the at least one processor, the at least one processor is caused to perform:

acquiring data to be processed; and acquiring a data processing result output by inputting the data to be processed into the target audio data processing model.

12. A non-transitory computer-readable storage medium stored with computer instructions, wherein, the computer instructions are configured to cause a computer to perform:

acquiring sample audio data;

acquiring an initial audio data processing model, the initial audio data processing model comprising a plurality of forward nodes for outputting a plurality of intermediate results corresponding to the sample audio data;

determining a plurality of time-dependent features corresponding to the plurality of forward nodes, wherein the time-dependent feature of the forward node indicates whether there is a time-dimension calculation association relationship between a target forward node and other forward nodes;

acquiring an audio data processing model to be trained by processing the initial audio data processing model based on the plurality of time-dependent features;

acquiring a target audio data processing model by training the audio data processing model to be trained using the sample audio data and the plurality of intermediate results, acquiring audio data to be processed; and acquiring an audio data processing result output by inputting the audio data to be processed into the target audio data processing model, wherein, the computer instructions are configured to cause a computer to perform:

determining the target forward node from the plurality of forward nodes based on the plurality of time-dependent features;

generating a check node corresponding to the target forward node, the check node being configured to output a check result corresponding to the sample audio data, the check result being the same as an intermediate result output by the target forward node; and generating the audio data processing model to be trained based on the plurality of forward nodes and the check node, wherein generating the check node corresponding to the target forward node comprises:

determining a check and memory comprehensive benefit value for the target forward node based on a formula, wherein the formula is recommit_benefit=output_size−input_size+recompute_input_size, in which recommit_benefit is the check and memory comprehensive benefit value, output_size is a memory size of an intermediate result output by the target forward node, input_size is a memory size of all inputs for the target forward node, recompute_input_size is a memory size of an input for the target forward node during a reverse calculation of the model process.

13. The non-transitory computer-readable storage medium of claim 12, wherein, the computer instructions are configured to cause a computer to perform:

acquiring the target audio data processing model by training the audio data processing model to be trained using the sample audio data, other intermediate results and the check result;

wherein, the other intermediate results are intermediate results corresponding to the sample audio data output by other forward nodes, and the target forward node and the other forward nodes constitute the plurality of forward nodes.

14. The non-transitory computer-readable storage medium of claim 13, wherein, the computer instructions are configured to cause a computer to perform:

acquiring the plurality of intermediate results output by the plurality of forward nodes in the audio data processing model to be trained by taking the sample audio data as a forward training input of the audio data processing model to be trained; and deleting the intermediate result output by the target forward node, and retaining the other intermediate results output by the other forward nodes.

15. The non-transitory computer-readable storage medium of claim 14, wherein the audio data processing model to be trained comprises a plurality of reverse nodes for outputting predicted tuning parameters corresponding to the sample audio data, the sample audio data having corresponding annotated tuning parameters, wherein, the computer instructions are configured to cause a computer to perform:

acquiring the check result corresponding to the sample audio data, generated by the check node;

acquiring the predicted tuning parameters output by the plurality of reverse nodes by taking the sample audio data, the other intermediate results, and the check result as a reverse training input of the audio data processing model to be trained; and taking the trained audio data processing model as the target audio data processing model in response to the predicted tuning parameters and the annotated tuning parameters satisfying a preset condition.

16. The non-transitory computer-readable storage medium of claim 12, wherein, the time-dependent feature of the target forward node indicates that there is no time-dimension calculation association relationship between the target forward node and other forward nodes.

\* \* \* \* \*